United States Patent [19]

Saji et al.

[11] Patent Number: 5,031,212
[45] Date of Patent: Jul. 9, 1991

[54] DIALER CIRCUIT

[75] Inventors: Mitsuro Saji; Yoshihiro Ikefuji, both of Kyoto, Japan

[73] Assignee: Rohm Co., Ltd., Japan

[21] Appl. No.: 472,182

[22] Filed: Jan. 30, 1990

[30] Foreign Application Priority Data

Feb. 10, 1989 [JP] Japan .............................. 1-14807[U]

[51] Int. Cl.$^5$ ........................................... H04M 1/00
[52] U.S. Cl. ................................... 379/359; 379/355; 379/361; 379/362; 379/418
[58] Field of Search ............... 379/355, 359, 360, 361, 379/362, 418

[56] References Cited

U.S. PATENT DOCUMENTS 4,365,116 12/1982 Pira et al.
4,887,294 12/1989 Ruey-Guang ....................... 379/355

FOREIGN PATENT DOCUMENTS 0758562 8/1980 U.S.S.R. .............................. 379/359

Primary Examiner—Jin F. Ng
Assistant Examiner—Jhancy Augustus
Attorney, Agent, or Firm—Oliff & Berridge

[57] ABSTRACT

A dialer circuit comprising a microcomputer for controlling the dialing of a telephone. This dialer circuit is capable of storing a telephone number and transmitting a signal concerning this telephone number to a telephone circuit according to a given command. The dialer circuit is equipped with a means for detecting the ON state or the OFF state of a hook switch; upon detection of the state of the hook switch, the dialer circuit performs a resetting of the entire system except a memory in which the telephone number is stored. The result is that when operating the hook switch, it is possible to automatically reset only the system, thus effectively preventing any reckless driving of the system.

5 Claims, 5 Drawing Sheets

DIALER CIRCUIT

BACKGROUND OF THE INVENTION

1. Field of the Invention

This invention relates to a dialer circuit for controlling the dialing in a telephone, and more particularly to a reset circuit for restoring the normal operation of a dialer when the dialer is about to make a reckless driving.

2. Description of the Related Art

As great advances have been made in recent years in semiconductor technology, the application of control systems using ICs, ISIs, etc. to various machines and equipments are on the rise. Telephones are not an exception; their operation is performed under the control of ICs, for example, in which a variety of functions are incorporated. Many of modern telephones have the function of memorizing a preset telephone number several times and automatically dialing the preset telephone number in a simple operation. Generally, such automatic dialing function is performed by an dialer composed of a microcomputer built in the telephone.

In this type of telephone, when the dialer makes a reckless driving or stampede due to external noises, for example, a predetermined dialing operation is difficult to achieve. For restoring it to the normal operation, it is necessary to bring the telephone back to its initial state by resetting.

Consequently, the conventional telephone also is equipped with a reset button for resetting the system of a dialer and the entire telephone as well. Further, in a telephone having no reset button, the resetting operation must be performed by switching off the power source to terminate all the operations of a dialer and then switching on the power source so that a reset signal is issued in the telephone to restore the initial state of the telephone.

In this conventional dialer, its reckless driving is prevented by making a resetting with a reset button or by switching off the power source to stop the operation of the dialer. However, according to such conventional resetting method, the microcomputerdialer would necessarily be brought back to its initial state. Generally in the dialer, since there is incorporated a program so as to erase the contents of a memory at the time of initial setting, a telephone number or other data memorized in a telephone would be deleted. When the telephone number in the memory have once been erased, then the user must take the trouble of inputting the telephone number again, which is laborious and time-consuming.

SUMMARY OF THE INVENTION

It is therefore an object of this invention to provide a dialer circuit which is capable of preventing any reckless driving of a dialer in a particularly simple operation without fail, holding the contents in a memory.

According to this invention, a dialer circuit for controlling the dialing of a telephone, comprising: a CPU for controlling the entire operation of the dialer circuit by executing a predetermined system program; a memory connected to the CPU for storing data such as a telephone number; a hook detector means for detecting whether a hook switch for connecting the telephone with an external telephone circuit and breaking the connection therebetween assumes an ON state or an OFF state; and a system reset means for outputting a system reset signal to perform a system resetting in the CPU, with holding the contents of the memory, when the ON state or the OFF state of the hook switch is detected by the hook detector means.

When the ON state or the OFF state of the hook switch is detected, this dialer circuit will be operative to reset the system of the dialer except the memory; this is, it is possible to reset only the system without providing any additional terminal. In an ordinary dialer, because data about the ON state and the OFF state of the hook switch are essential, signals concerning the ON state and the OFF state of the hook switch are inputted to the dialer.

Further, since a signal from the hook switch is the top priority signal that may stop all of the previous operation, there will be no trouble in any other operation if the system is reset by the signal from the hook switch. Regarding the operation of the telephone, when it does not work correctly, it is very natural for the user to operate the hook switch; it is particularly effective to utilize the operation of this hook switch to issue a reset signal for the dialer.

The above and other advantages, features and additional objects of this invention will be manifest to those versed in the art upon making reference to the following detailed description and the accompanying drawings in which a preferred structural embodiment incorporating the principles of this invention is shown by way of illustrative example.

BRIEF DESCRIPTION OF THIS DRAWINGS

DETAILED DESCRIPTION

Figure 1:
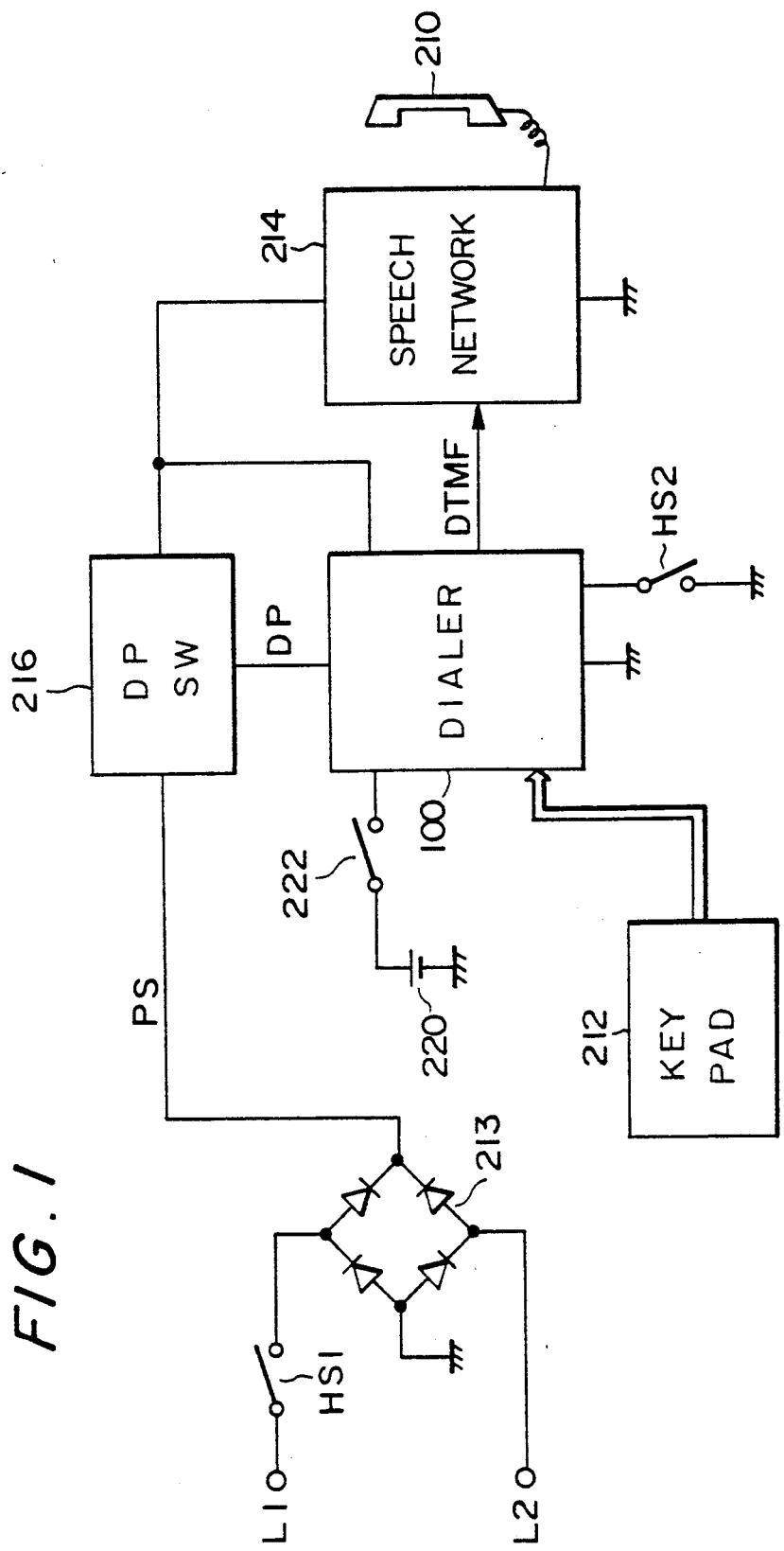
FIG. 1 is a block diagram showing the general structure of a telephone to which a dialer circuit of this invention is incorporated.

The principles of this invention are particularly useful when embodied in a reset circuit of a dialer of a telephone. Before describing the reset circuit in detail, the general structure of the telephone will be described with reference to FIG. 1.

The telephone has a handset 210 and a key pad 212; sound signals inputted in and outputted from the handset 210 are transmitted to and from a telephone circuit. The key pad 212 is an input means for performing the dialing or other operation. For installation, the telephone is connected to the telephone circuit via two terminals L1, L2.

A hook switch HS1 is disposed between one of the terminals L1 and a rectifier 213. The hook switch HS1 will assume its ON state when the handset 210 is picked up (off-hook) and its OFF state when the hand set 210 is placed back on the telephone body (on-hook). Then the telephone is connected to the telephone circuit at the off-hook time.

A speech network 214 includes an amplifier for outputting to the telephone circuit an electrical signal inputted from the handset 210, being connected to the terminals L1, L2 via the rectifier 210. Further, according to a signal inputted from the key pad 212, a dialer circuit 100 outputs ON/OFF pulses DP, for example, to perform a dialing.

Dialing can be performed selectively by a dialing pulse or by a DTMF (dual tone multifrequency) signal.

In the case of using a dialing pulse, a DP switch circuit 216 is switched on and off by on/off pulses DP to connect and break a power source line PS to perform a dialing.

In the case of using a DTMF signal, the DTMF signal generated by the dialer circuit 16 is amplified by the speech network 214 and is then outputted thereby to the telephone circuit via the power source line PS.

A power source 220 is connected to the microcomputer-dialer 100, to which an electric power is supplied from the power source 222 during the operation other than ordinary talking over the telephone. A switch HS2 is adapted to be switched on and off along with the hook switch HS1; the dialer 100 can take recognition of the on-hook and off-hook states of the telephone from the ON state and the OFF state of this switch HS2.

Figure 2:
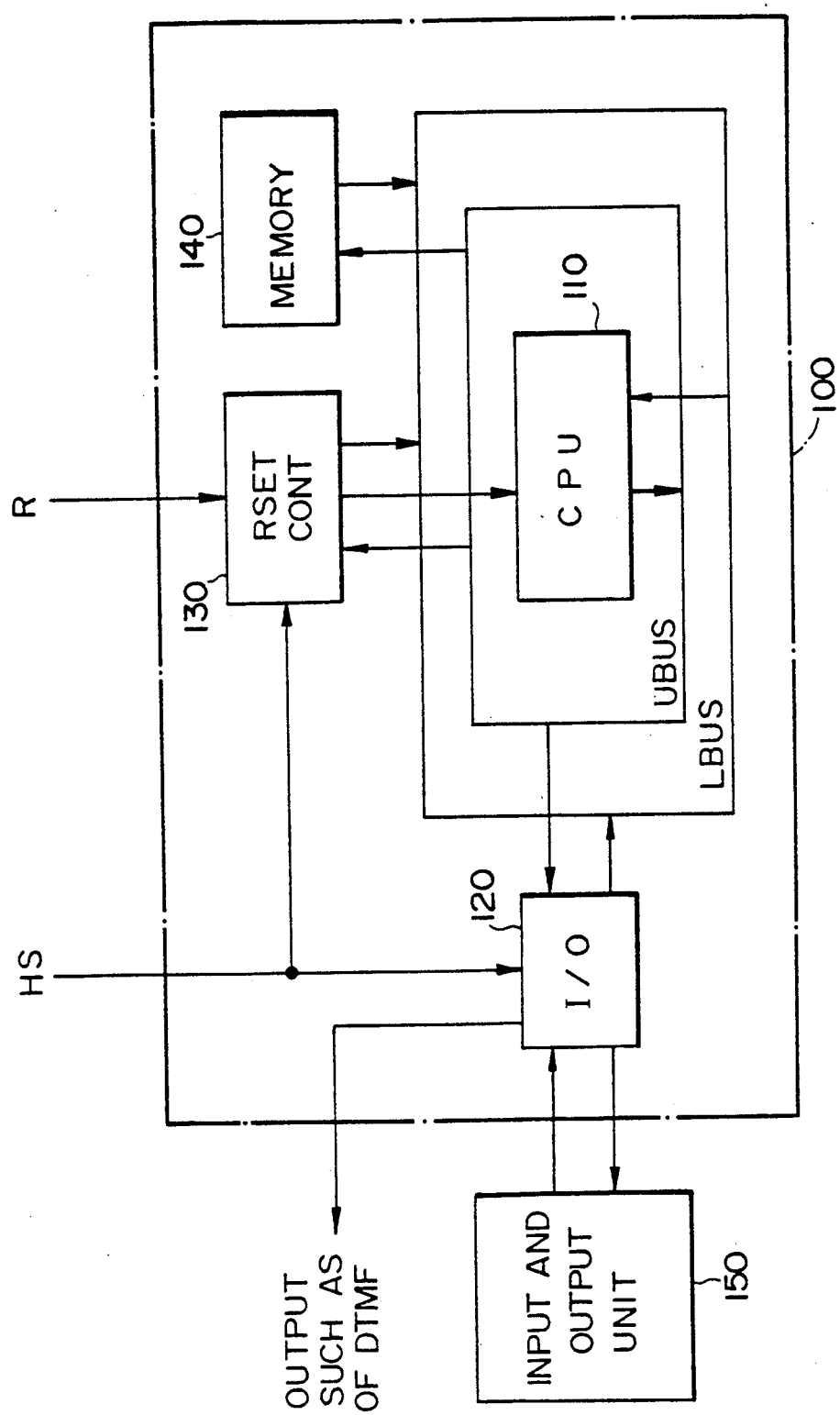
FIG. 2 is a block diagram showing the general structure of the dialer circuit of FIG. 1.

The general structure of the dialer 100 will now be described with reference to FIG. 2.

The dialer 100 includes a CPU (central processing unit) 110 for performing various processes such as an operating process, an input/output interface (I/0) 120 composed of control blocks for data input and output to and from an external apparatus, a reset circuit 130, and a memory 140 for storing data such as a telephone number. The input/output interface 120 and the CPU 110 are connected to each other by two data buses UBUS, LBUS; UBUS transmits data from CPU 110 to the input/output interface 120, while LBUS transmits data from the input/output interface 120 to the CPU 110.

The input/output interface 120 has at least two functions: making a connection between the dialer 100 and an external apparatus; and issuing a DTMF signal at the speech network 214. An input/output apparatus 150 includes the key pad 212 for dialing, and the speech network 214 for sending out a DTMF signal, as also shown in FIG. 1. In FIG. 2, each of the input/output apparatus 150 and the input/output interface 120 is illustrated as a single unit. Practically, however, the individual unit is divided into a plurality of parts according to its function.

The memory 140 is a place in which data such as a telephone number are to be stored. When a calling-on command for the memorized telephone number is inputted from the input/output apparatus 150, the CPU 110 uses the telephone number stored in the memory 140 as the telephone number to be inputted from the input/output apparatus 150.

In the dialer 100, a dial signal from the key pad 212 in the input/output apparatus 150, for example, is received by the input/output interface 120, whereupon the dial signal is transmitted to the CPU 110 via LBUS. The CPU 110 controls the generation of DTMF signals, for example, according to this dial signal. If a command from the key pad 212 is a delivering command for the memorized telephone number, a designated telephone number is read from the memory 140, according to which the generation of DTMF signals is controlled.

In this invention, the dialer 100 has the reset 130, which receives both a hook signal HS concerning the ON state and the OFF state of the hook switch HS1 and an initial reset signal R concerning the resetting the entire system and the erasing the contents of the memory 140, thus controlling the resetting of the dialer 100.

Figure 3:
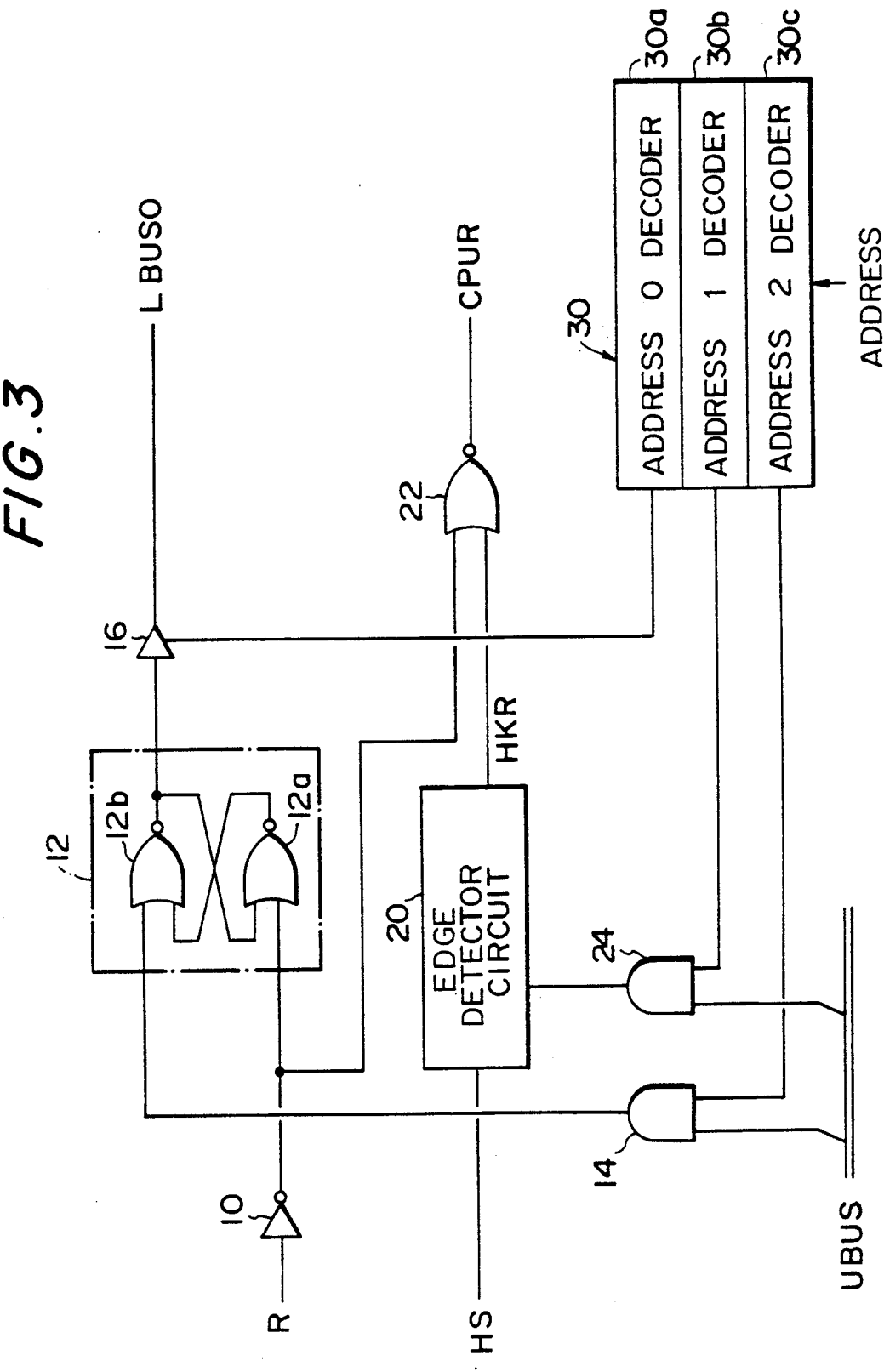
FIG. 3 is a circuit diagram showing one embodiment of a reset circuit of the dialer circuit.

The reset circuit 130 of this dialer 100 will now be described in detail with reference to FIG. 3. At the time of power supply to switch a switch 222 from its OFF state to its ON state, or at the time of operating a reset button (not shown), a reset signal varying from 0 to 1 after the lapse of a predetermined time is inputted to an inverter 10 where the reset signal is inverted and is then outputted as a signal varying from 1 to 0. Such an initial reset signal R can be obtained by a comparator which outputs a signal varying from 0 to 1 when a voltage at a predetermined capacitor reaches a predetermined threshold value, with charging the capacitor with a supply voltage.

The inverter 10 is connected to a first latch circuit 12, to which the above-mentioned inverted initial reset signal is to be supplied. The first latch circuit 12 is composed of two NOR circuits 12a, 12b; an output signal from the inverter 10 is inputted to one input terminal of one of the NOR circuits 12a. The output terminal of the NOR circuit 12a in the first latch circuit 12 is connected to one input terminal of the other OR circuit 12b. The output terminal of the other NOR circuit 12b is connected to the one NOR circuit 12a. In short, the respective outputs of the two NOR circuits 12a, 12b are inputted to each other. To the other input terminal of the other NOR circuit 12b, the output of an AND circuit 14 is inputted. The output of the other NOR circuit 12b is outputted to LBUSO, i.e. the lowermost bit of LBUS, via a gate 16.

Meanwhile, the hook signal HS concerning the ON state and the OFF state of the hook switch is inputted to an edge detector circuit 20, which outputs a reset signal CPUR to the CPU via a NOR circuit 22. A release signal A for the edge detector circuit 20 is supplied from an AND circuit 24. To one input terminal of each of the two AND circuits 14, 24, a signal from UBUSO, i.e. the lowermost bit of UBUS, is inputted.

Additionally, to the AND circuits 14, 24 and the gate 16, a signal from an address decoder 30 is supplied. This address decoder 30 outputs signals one at a time when one of addresses 0 to 2 is designated in the CPU. Specifically, the address decoder 30 outputs 1 signal to the gate 16 from address 0 decoder 30a when the address designated from the CPU is 0, and also outputs 1 signal to the AND circuit 24 from address 1 decoder 30b when the designated address is 1, and further outputs 1 signal to the AND circuit 14 from address 2 decoder 30c when the designated address is 2.

In this dialer reset circuit, when the power is supplied or when initial resetting, i.e., the reset button for instructing to initialize the entire system including the memory is operated, a signal varying from 0 to 1 as an initial reset signal R is supplied to the inverter 10. The inverter 10 inverts the initial reset signal R and supplies to the first latch circuit 12 the signal varying from 1 to 0.

In that time, since the program of the CPU is not yet running, the reading of a program counter is not started as yet. Consequently, from the address decoder 30, 1 signal is not outputted. So a signal from the AND circuit 14 is 0.

At the start of the power supply (initial resetting), 1 signal is inputted to the one NOR circuit 12a of the first latch circuit 12, and 0 signal is inputted to the other NOR circuit 12b. When 1 signal is inputted to the one NOR circuit 12a, the output of this NOR circuit 12a will necessarily be 0. Therefore, to either input terminal of the other NOR circuit 12b, 0 signal is inputted; the output signal of this NOR circuit 12b will be 1. Thus the output signal of the first latch circuit 12 is set to 1 initially.

Then the above-mentioned initial reset signal R varies from 0 to 1, whereupon a signal being supplied to the NOR circuit 12a varies from 1 to 0. But because 1 signal is inputted to the other input terminal of the NOR circuit 12a, the output of this NOR circuit 12a remains 0. Therefore, when the initial resetting is conducted, the first latch circuit 12 is set to such a state that signals to be inputted are 0, 0, and its output is 1.

In this state, the initialization of the CPU is terminated, and the program counter starts reading from 0 address to start the operation of the CPU. Specifically, as shown in FIG. 2, the contents of 0 address 0 onward of the program are read successively by the program counter. As the reading of address 0 is carried out according to this program, 1 signal is outputted from address 0 decoder 30a of the address decoder 30 so that the gate 16 assumes its ON state. At that time, since the output of the first latch circuit 12 is 1, 1 signal will be outputted from LBUSO.

Figure 4:
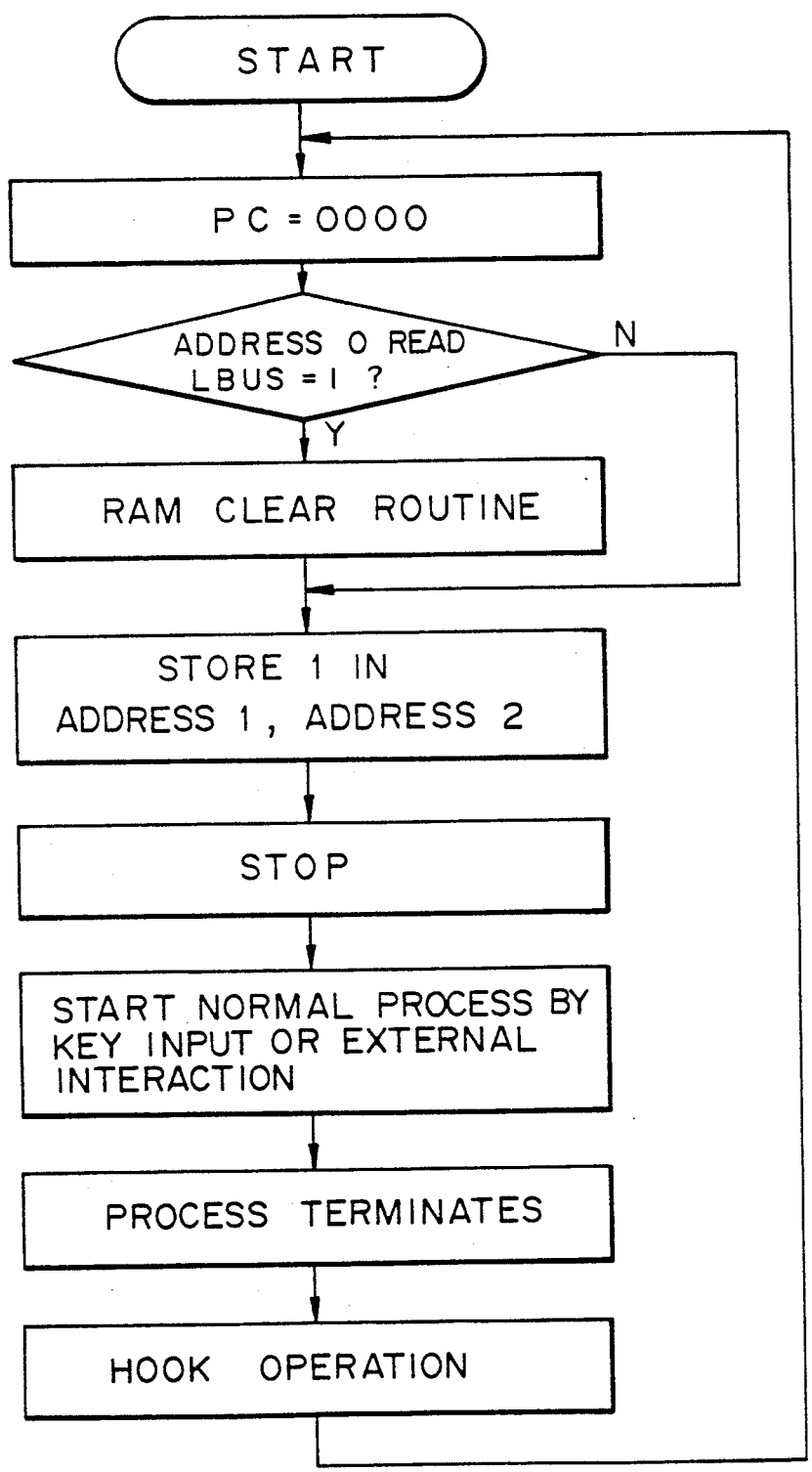
FIG. 4 is a flowchart showing the operation of the reset circuit of FIG. 3.

In FIG. 4, as a judgment is made whether LBUSO is 1 or not (FIG. 4), LBUSO is 1, and then the procedure enters RAM clear routine. As a result, the contents of RAM serving as the memory for data such as a telephone number has been erased. If the value of LBUSO is not 1, no initial resetting is not conducted so that this erasing of the RAM is not performed.

Then the CPU stores 1 in the addresses 1, 2 according to the flowchart of FIG. 4. Specifically, by designating the addresses 1, 2, 1 signal is inputted from the address 1 decoder 30b and the address 2 decoder 30c of the address decoder 30, at which time 1 signal is outputted from the AND circuits 14, 24 as the datum of UBUSUO is 1.

When the output of the AND circuit 14 is 1, the output of the latch circuit 12 to the NOR circuit 12b will be 1. Since the input to the above-mentioned NOR circuit 12a is 0, the output of the latch circuit 12 will be 0. In other words, the output of the latch circuit 12, whose output was 1 according to the initial reset signal R as discussed above, will be reset to 0. Also if the output of the AND circuit 14 returns to 0, the output of the latch circuit 12 remains 0 as latched.

Therefore the output of the latch circuit 12 will be 1 when the initial reset signal R varies from 0 to 1, and is reset to 0 when the output of the address 1 decoder 30b varies to 1. Consequently, by reading the value of LBUSO at the font end of the program as discussed above, a judgment on whether it is the initial resetting or not, depending on whether its value is 1 or 0. Only in the case of the above-mentioned initial resetting, the resetting of the system including RAM can be performed.

If the hook operation is conducted, the hook signal HS concerning the ON state and the OFF state of this hook switch is inputted to the edge detector circuit 20. The edge detector circuit 20 detects the edge of the hook signal HS and outputs an HKR signal remaining 1 until 1 signal from the address decoder 30 is inputted. This HKR signal will be a system reset signal CPUR only for the system of CPU via the NOR circuit 22. Because the output from the inverter 10 also is inputted to this NOR circuit 22, the system reset signal CPUR is outputted to perform a resetting of the CPU when either the initial reset signal R or the hook switching operation is effected. The resetting of the CPU by this system reset signal CPUR is to reset only the operation of the system, without resetting the memory.

Figure 5:
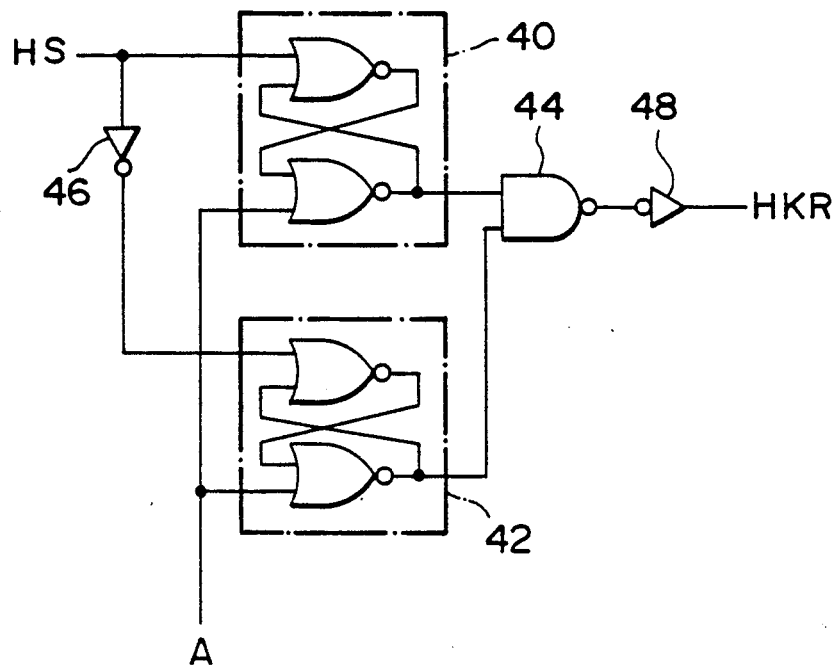
FIG. 5 is a circuit diagram showing an edge detector circuit.

The structure of the edge detector circuit 20 will now be described in greater detail with reference to FIG. 5. This edge detector circuit 20 is composed of two latch circuits 40, 42, a single NAND circuit 44, and two inverter 46, 48.

The hook signal HS concerning the ON state and the OFF state of the hook switch is inputted to one of the latch circuits 40 directly and to the other latch circuit 42 via the inverter 46. To these latch circuits 40 42 a release signal A is inputted.

The outputs of the latch circuits 40 42 are inputted to the NAND circuit 44, whose output is inverted by the inverter 48 to be a hook reset signal HKR based on the hook switch which is the output of the edge detector circuit 20.

Figure 6:
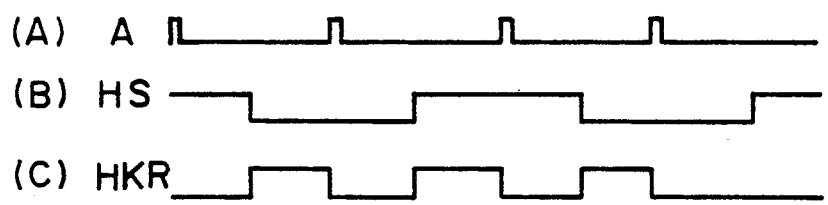
FIG. 6 show wave forms of various signals, illustrating the operation of the edge detector circuit of FIG. 5.

Here the release signal A, as shown in FIG. 6(A), serves to produce a small pulse signal after the lapse of a predetermined time after the hook switch has been operated. Specifically, if the hook switch is operated as is apparent from the flowchart of FIG. 4, the processing starts from 0 address of the program counter. When the program to store 1 at the address 1 is executed, 1 signal from the address decoder 30 is supplied to the AND circuit 24, at which time 1 signal is outputted.

Further, the hook signal HS is 0 during the off-hook state (talking over the telephone), and is 1 during the on-hook state (waiting for talking), having the characteristic such as shown in FIG. 6(B).

When 1 signal as the release signal A is supplied to the edge detector circuit 20, either latch circuit 40, 42 outputs 0 signal without fail, irrespective of the state of the hook signal HS. So the output of the NAND circuit 44 will be 1, while the hook reset signal HKR will be 0.

In the meantime, because of a pulse-like signal, the release signal A returns to 0 immediately. When the release signal A thus returns to 0, the output of one of the latch circuits 40, 42 varies to 1. But the input to the NAND circuit 44 is 0, 1 so that its output remains 1 unchanged.

In this state, if the hook switch signal HS varies from 1 to 0 or from 0 to 1, the output of either latch circuit 40, 42 will be 1. Therefore, the output of the NAND circuit 44 will be 0, while the hook reset signal HKR outputted via the inverter 48 will be 1. When the release signal A is inputted, the hook reset signal HKR will return to 0.

More specifically, the hook reset signal HKR will be 1 due to the building-up or building-down of the hook signal HS as shown in FIG. 6(C) and will return to 0 due to the release signal A after the lapse of a predetermined time.

In this invention, since the system is reset by this hook reset signal HKR, it is possible to automatically reset the system without fail during the operation of the hook switch.

Here the hook switch signal is the top priority signal in the telephone. This is, even when conducting any work, the starting or terminating of talking over the telephone will be conducted without fail according to the ON state or the OFF state of the hook switch. Therefore, the system resetting can be conducted according to the ON or OFF signal of this hook switch, without causing any problem. So by detecting the ON or OFF signal of the hook switch to reset the system, it is possible to initialize the system without fail when conducting any work or operation so that any reckless driving or stampede of the dialer can be prevented with sureness.

As mentioned above, according to the dialer reset circuit, it is possible to detect the signal of the hook switch to thereby conduct the system resetting without erasing the contents of the memory.

What is claimed is:

1. A dialer circuit for controlling the dialing of a telephone, comprising:
   (a) a CPU for controlling the entire operation of the dialer circuit by executing a predetermined system program;
   (b) a memory connected to said CPU for storing data such as a telephone number;
   (c) a hook detector means for detecting whether a hook switch assumes an ON state or an OFF state, said hook switch connecting the telephone with an external telephone circuit in the ON state and breaking the connection therebetween in the OFF state; and
   (d) a system reset means for outputting a system reset signal to perform a system resetting in said CUP, with holding the contents of said memory, when the ON state or the OFF state of the hook switch is detected by said hook detector means.

2. A dialer circuit according to claim 1, wherein said hook detector means includes an edge detector circuit for detecting a building-up or building-down edge of a hook signal adapted to be changed over to a high level or a low level depending on the ON state or the OFF state of the hook switch, said system reset means for outputting the system reset signal according to the output of said edge detector circuit.

3. A dialer circuit according to claim 2, wherein said edge detector circuit includes:
   a first latch circuit to which the hook signal is inputted as it is;
   a second latch circuit to which the hook signal is inputted as it is inverted; and
   a logical circuit for performing a logical sum of the outputs of said first and second latch circuits.

4. A dialer circuit according to claim 1, further including an initial reset signal generator means for outputting an initial reset signal, and a memory clear signal generator means for outputting a memory clear signal to clear the contents of said memory when the initial reset signal is inputted to the dialer circuit.

5. A dialer circuit according to claim 4, wherein said memory clear signal generator means includes a third latch circuit to which the initial reset signal is inputted, and a gate for opening and closing a path of the output of said third latch circuit, whereby the system resetting is performed in response to the initial reset signal, during which time a command is issued to open said gate.

* * * * *